United States Patent
Mankins

(10) Patent No.: US 7,415,012 B1
(45) Date of Patent: Aug. 19, 2008

(54) SYSTEMS AND METHODS FOR HIGH SPEED PACKET CLASSIFICATION

(75) Inventor: David P. Mankins, Cambridge, MA (US)

(73) Assignees: Verizon Corporate Services Group Inc., New York, NY (US); BBN Technologies Corp., Cambridge, MA (US)

( * ) Notice: Subject to any disclaimer, the term of this patent is extended or adjusted under 35 U.S.C. 154(b) by 742 days.

(21) Appl. No.: 10/854,789

(22) Filed: May 27, 2004

Related U.S. Application Data

(60) Provisional application No. 60/473,681, filed on May 28, 2003.

(51) Int. Cl.
*H04L 12/56* (2006.01)
(52) U.S. Cl. .................................................. 370/389
(58) Field of Classification Search ........................ None
See application file for complete search history.

(56) References Cited

U.S. PATENT DOCUMENTS

| | | | | |
|---|---|---|---|---|
| 5,835,726 | A * | 11/1998 | Shwed et al. | 709/229 |
| 6,772,223 | B1 * | 8/2004 | Corl et al. | 709/238 |
| 7,061,874 | B2 * | 6/2006 | Merugu et al. | 370/255 |
| 2002/0009076 | A1 * | 1/2002 | Engbersen et al. | 370/389 |
| 2002/0143724 | A1 * | 10/2002 | Corl et al. | 707/1 |
| 2004/0039940 | A1 * | 2/2004 | Cox et al. | 713/201 |
| 2004/0133590 | A1 * | 7/2004 | Henderson et al. | 707/102 |

OTHER PUBLICATIONS

Patz et al., "Multidimensional Security Policy Management for Dynamic Coalitions," BBN Technologies, Cambridge, MA, Jun. 12-14, 2001.
Seung-Jin Baek et al., "Policy-based Hybrid Management Architecture for IP-based VPN," pp. 1-9, Apr. 2000.
IPsec Policy Discovery Architecture, Oct. 1999, A. Keromytis et al., pp. 1-7 http://www.watersprings.org/pub/id/draft-keromytis-ipsp-arch-00.txt.
John Zao et al., "Domain Based IP Security Policy Management," GT/BBN Technologies, DISCEX'00—Security Policy Session, Jan. 25, 2000.
Mankins et al., Very High Speed Encryptor Follow-On (VHSE2) Classification Engine, BBN Technologies, pp. 1-9, May 29, 2003.

* cited by examiner

*Primary Examiner*—Anh-Vu H Ly

(57) ABSTRACT

Systems and methods are disclosed for classifying packets with a rule. In one exemplary embodiment, the method includes receiving a packet; determining a key value for the received packet; identifying a rule corresponding to the determined key value by searching a set of rules, the set of rules being decorrelated such that there is no overlap in any key values corresponding to the decorrelated set of rules.

32 Claims, 10 Drawing Sheets

| KEY (OR PORTION) | RULE(S) | RULE NUMBER |
|---|---|---|
| 1-100 | DISCARD PACKET | 1 |
| 100 | ROUTE TO NETWORK 2 | 2 |
| 5 | ROUTE TO NETWORK 3 | 3 |
| 10 | DECRYPT PACKET | 4 |
| 20 | ENCRYPT PACKET AND SEND TO NETWORK 3 | 5 |
| ... | ... | ... |
| 256 | ROUTE TO NETWORK 4 | 16 |

FIG. 4

SYSTEMS AND METHODS FOR HIGH SPEED PACKET CLASSIFICATION

CROSS REFERENCE TO RELATED APPLICATION

This application claims the benefit of priority to U.S. provisional application 60/473,681, filed May 28, 2003, entitled "A METHOD FOR CLASSIFYING PACKETS TO THEIR SECURITY ASSOCIATION IN A HIGH-SPEED SECURITY GATEWAY," which is expressly incorporated by reference herein in its entirety.

This invention was made with Government support under Contract No MDA904-02-G-0068. The Government may have certain rights in this invention.

BACKGROUND OF THE INVENTION

I. Field of the Invention

The present invention generally relates to communication systems and, in particular, to systems and methods for classifying packets.

II. Background and Material Information

Communication devices, such as routers, firewalls, switches, and the like, must frequently classify a packet based on its address to determine what (if any) additional processing steps should be performed. Based on a packet source Internet Protocol (IP) address, a communication device may read the packet, search for a rule corresponding to the source IP address, and then classify the packet with the identified rule to facilitate further processing. The rule may simply state a function (or operation) to be performed on the packet based on its address. For example, a packet from source IP address "X" may be associated with a rule that requires that the packet be discarded, while another rule may state that a packet from source IP address "A-Z" should be encrypted and then forwarded to its destination. As such, the rules enable communication devices to process incoming packets specifically based on their address information.

Although such rule-based processing, enhances the ability of a communication device to process packets, such rule-based processing introduces delays. For example, if a communication device requires 250 milliseconds to read a packet and its corresponding address information, search for a rule based on the packet's address, and then apply the identified rule, the packet will undergo 250 milliseconds of delay. With some types of traffic, such as voice, a 250-millisecond delay may cause an echo. Moreover, long delays also require additional memory in the communication device to buffer any incoming packets received during the delay period. As such, high-speed packet classification consistent with the present invention may improve the quality of data and reduce cost associated with additional buffer memory.

SUMMARY OF THE INVENTION

Accordingly, the present invention is directed to systems and methods for classifying packets. More particularly, the present invention is directed to classifying packets by using a search tree with a decorrelated set of rules.

A communication system consistent with the systems and methods of the present invention may classify packets. Moreover, systems and methods consistent with the present invention may receive a packet; determine a key value for the received packet; and identify a rule corresponding to the determined key value by searching a set of rules, the set of rules being decorrelated such that there is no overlap in any key values corresponding to the decorrelated set of rules.

In one embodiment consistent with the systems and methods of the present invention, there is provided a method of classifying packets. In particular, systems and methods consistent with the invention may determine a key value for a packet received from a first network; decorrelate a set of rules, the decorrelated set of rules having corresponding key values; determine a rule from the decorrelated set of rules by searching a search tree having the decorrelated set of rules; and classify the packet based on the determined rule, such that the determined rule may be applied to the packet.

Additional features and advantages of the invention will be set forth in part in the description that follows or may be learned by practice of the invention. The features and advantages of the invention may be realized and attained by the systems and methods particularly described in the written description, the appended drawings, and the claims.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention. In the drawings:

FIG. 4 illustrates an exemplary database storing uncorrelated rules in accordance with systems and method consistent with the present invention;

DETAILED DESCRIPTION

Reference will now be made in detail to embodiments of the invention, examples of which are illustrated in the accompanying drawings and described in the specification. Wherever possible, the same reference numbers will be used throughout the drawings to refer to the same or like parts.

Systems and methods consistent with the present invention facilitate high-speed packet classification to a rule by determining a key value for a received packet. The key value is read from the packet (e.g., packet address information) and then used to search a set of rules, which have been decorrelated such that there is no overlap in the key values of the rules. As such, a key value read from a packet uniquely maps to a rule. When the decorrelated set of rules are loaded in a search tree, such as a hardware-based search tree comprising comparators and/or registers, the identification of a rule from a decorrelated rule set is faster when compared to using rules that overlap.

Figure 1:
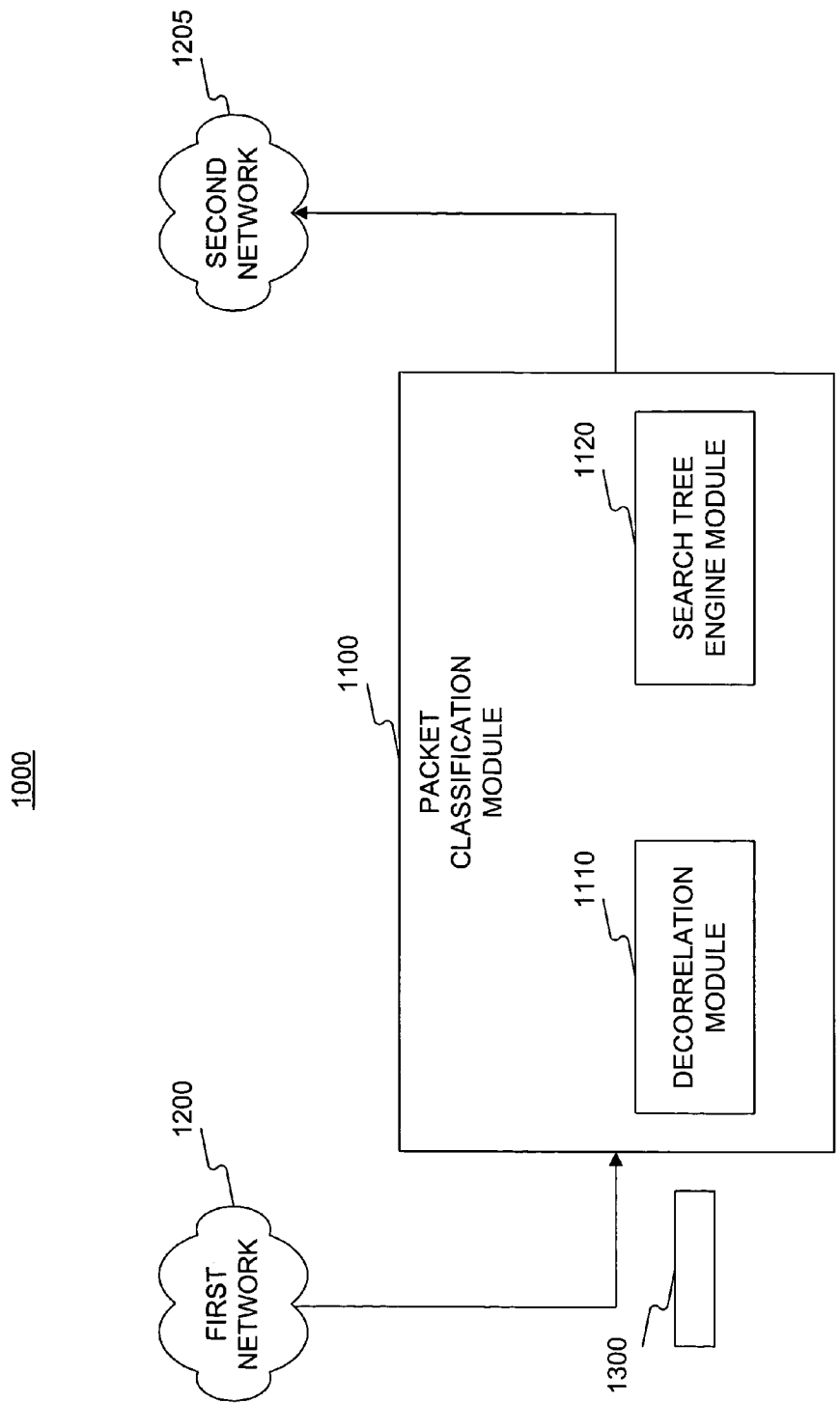
FIG. 1 illustrates an exemplary system environment in accordance with systems and methods consistent with the present invention.

FIG. 1 shows an exemplary system environment 1000 consistent with the system and methods of the present invention. Referring to FIG. 1, the system environment includes a packet classifier module 1100, a first network 1200, a second network 1205, and a packet 1300, each of which is described in greater detail below. Packet classifier module 1100 further includes a decorrelation module 1110 and a search tree engine module 1120.

In one embodiment, packet classifier 1100 receives a packet from a network, such as first network 1200, and then determines a key value for the packet. The key value may include any portion of the packet, which can be used to classify the packet by a rule. For example, the key value may include one or more of the following: a source IP (Internet Protocol) address, a destination IP address, a protocol, a source port, or a destination port. The rule(s) may be used to determine an operation and/or attain a certain result based on the received packet (and its key value). Based on the received packet's key value, a rule may classify, for example, a packet as being one that is discarded. Similarly, other key values for other packets may correspond to other rules that, for example, deny access to a (sub)network, grant access to a (sub)network, route to a certain (sub)network (e.g., second network 1205), further process the received packet (e.g., decrypted, encrypted, compress, and decompress), and/or any other function(s) that may be performed on a packet.

In order to classify a packet so that the correct rule may be determined, the key associated with the received packet is used to perform a search of search tree engine module 1120. The search tree engine module 1120 includes a decorrelated set of rules, such that no two rules have overlapping key values, as described in greater detail below. As such, only one rule applies to each key value of a received packet. One of ordinary skill in the art would recognize that a single rule might include a plurality of functions (e.g., decrypt packet and then forward to destination).

Because the rules have been decorrelated, a relatively fast tree search may be performed of the search tree engine module 1120, as described in greater detail below. Systems and methods consistent with the present invention enable packet classifier 1100 to classify a packet received from a source, such as first network 1200, with an associated rule quickly, so that the rule may be applied to the packet before sending it to a destination, such as second network 1205. Being able to process a packet quickly in high-speed networks is of interest because any significant delays in processing the packet increases the amount of memory required at the processing node. Moreover, depending on the type of data, such as voice, delays reduce the quality of the underlying voice data. With the above general description, the following provides a more detailed description of systems and methods consistent with the present invention.

Figure 2:
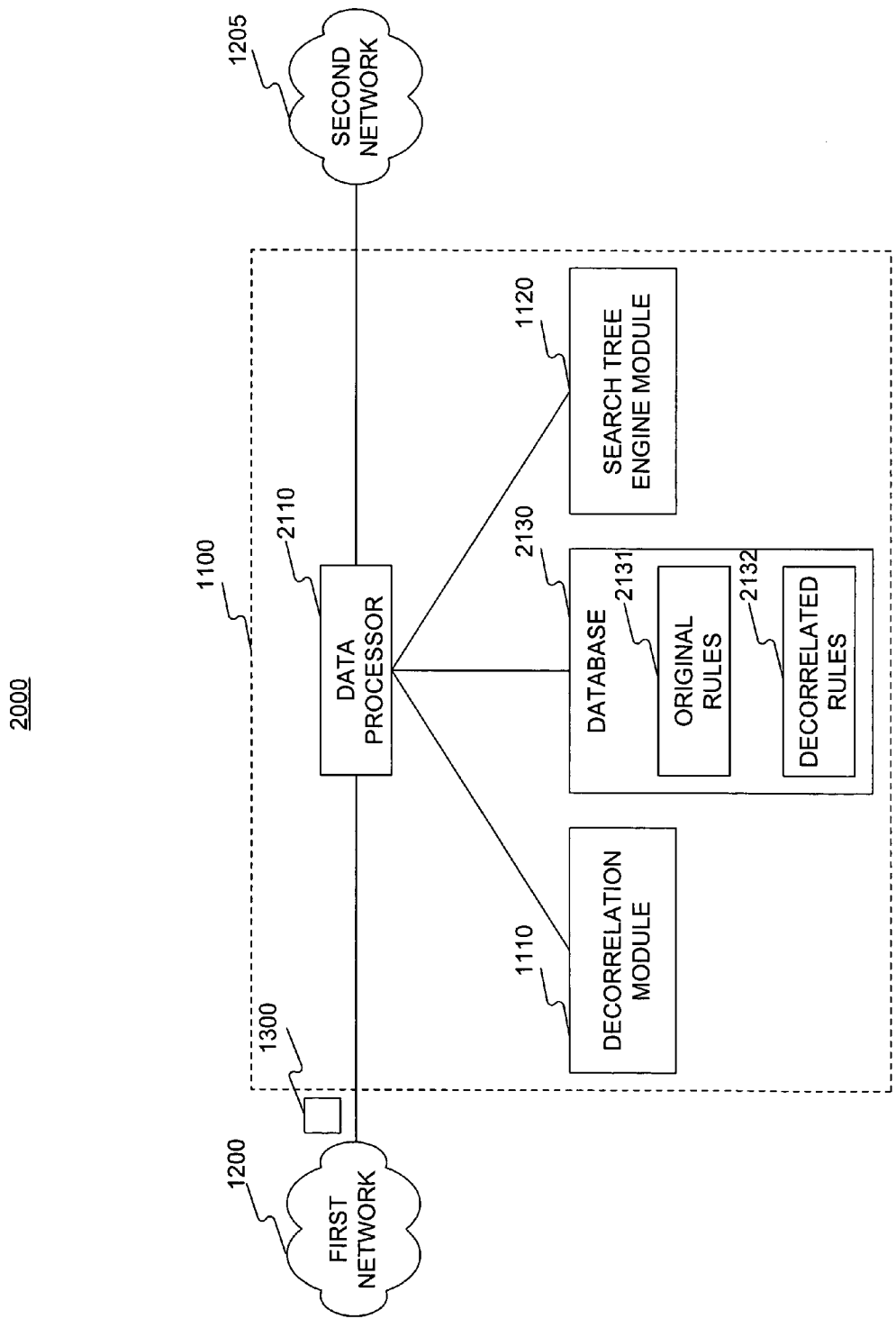
FIG. 2 illustrates another exemplary system environment in accordance with systems and methods consistent with the present invention.

FIG. 2 shows another exemplary system environment 2000 consistent with the system and methods of the present invention. FIG. 2 depicts first network 1200, second network 1205, packet 1300, and packet classifier 1100. Here, packet classifier 1100 of FIG. 1 is depicted in greater detail in FIG. 2. Specifically, packet classifier 1100 includes decorrelation module 1110 and search tree engine module 1120, both of which are depicted in FIG. 1, with the addition of a database 2130 and a data processor 2110.

Each of first network 1200 and second network 1205 may function as a communication medium and may include, alone or in any suitable combination, a telephony-based network, a local area network (LAN), a wide area network (WAN), a dedicated intranet, the Internet, a wireless network, or a bus. Further, any suitable combination of wired and/or wireless components and systems may be incorporated into the communication channels. One of ordinary skill may recognize that the first and second networks 1200-1205 may be considered the same network or, alternatively, different networks.

Packet 1300 as used herein may include as a basic unit of information that is capable of being transmitted to and/or received from a communication medium, such as a network. The term "packet" as used herein may include a bit, a byte, a datagram, a packet (e.g., an Internet Protocol (IP) packet), an ATM cell, and/or any other package of data or information. In some embodiments, the packets are compatible with Internet Protocol Version 4 (IPv4), while other embodiments use IP Version 6 (IPv6) compatible packets. The use of IPv4 and IPv6 are only exemplary and are in no way restrictive of the true scope of the invention, as recited by the claims herein.

Packet classifier 1100 may function to receive a packet, determine a key value of the packet, decorrelate a set of original rules to form a decorrelated (i.e., non-overlapping set of rules), and search a tree of decorrelated rules to determine which one of the rules corresponds to the key. In some embodiments, packet classifier 1100 may perform the function indicated by the rule (e.g., discard, forward to destination Y, route to destination X, encrypt with encryption key A, decrypt with encryption key B, etc.), while in other embodiments another processor (not shown) may perform the operation based on the rule identified by packet classifier 1100.

Decorrelation module 1110 functions to decorrelate a set of rules, which are correlated, such as original rules 2131 which are stored in database 2130. Database 2130 may store original rules 2131 which have not been decorrelated and also store a set of decorrelated rules 2132. Search tree engine module 1120 functions to load the decorrelated rules 2132 and perform searches for a rule based on a key value read from the received packet.

Packet classifier 1100 (or its components therein) may be embodied in the form of computer that may include one or more of the following: a central processing unit, a co-processor, memory, registers, and other data processing devices and systems as appropriate. Furthermore, packet classifier 1100 (or its components therein) may also be incorporated into any other data processing or communication device including, for example, a router, a cryptographic device, a gateway, a bridge, a firewall, a network security system, and/or a network management system.

Figure 3:
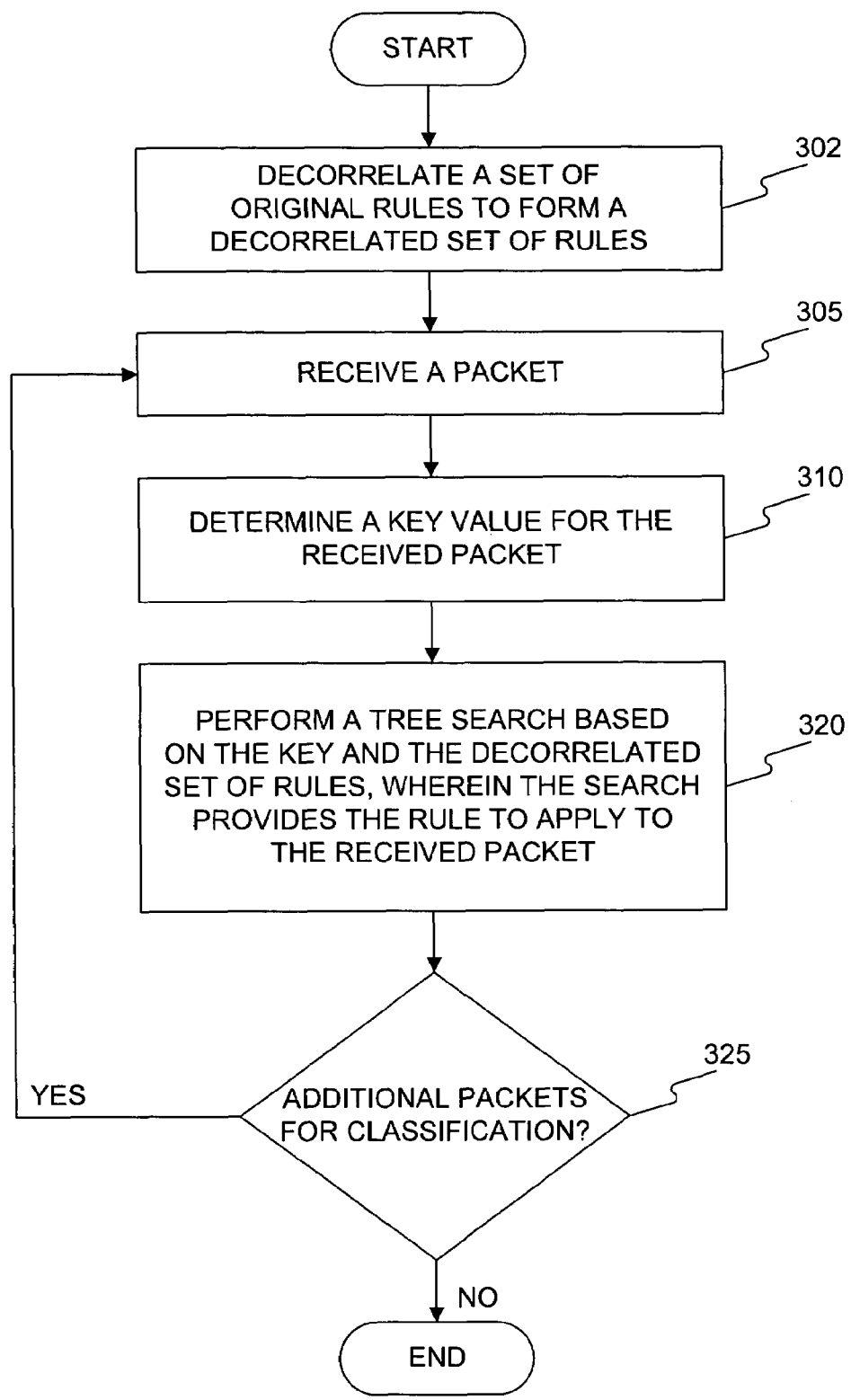
FIG. 3 is a flowchart showing exemplary steps for classifying a packet based on a key value and a decorrelated set of rules in accordance with systems and methods consistent with the present invention.

FIG. 3 depicts a flowchart with exemplary steps for performing a tree search based on a key value and a decorrelated set of rules. Referring to FIG. 3, decorrelation module 1110 decorrelates original rules 2131 to form decorrelated rules 2132 (step 302). Packet classifier 1100 then receives a packet and determines a key value for the received packet (steps 305-310). Search tree engine module 1120 loads into its search tree, the set of decorrelated rules 2132 stored in database 2130. Next, search tree engine module 1120 searches decorrelated rules 2132 for a rule associated with the key value read from the received packet (step 320). The rule identified by the search may then be applied to the received packet. If additional packets are to be classified (YES at step 325), the packet classifier returns to step 305. With the above basic description of steps 305-320, the following provides a more detailed description.

To decorrelate a set of original rules to form a set of decorrelated rules (step 315), packet classifier 1100 (or decorrelation module 1110 therein) re-writes some of the rules so that the rules do not overlap. FIG. 4 depicts an exemplary set of original rules 2131 stored in database 2130. Referring to FIG. 4, the first rule 410 discards packets if the key value (e.g., the source address) is between 1 and 100, the second rule 420 routes packets to network 2 (not shown) when the key value is 100, the third rule 430 routes packets to network 3 (not shown) when the packet has a key value of 5, the fourth rule 440 decrypts packets and then routes the packet to network 3 when the key value is 10, and so forth through rules 450-460. As can be seen by FIG. 4, rules 410-450 overlap, i.e., some of the 297-bit key values apply to more than one rule. For example, with a key value of 100, the packet classifier 1100 may either discard the packet (first rule 410) or route the packet to another network (second rule 420). With overlapping rules, searching for the correct rule to apply to the packet is made more burdensome. As such, systems and methods consistent with the present invention decorrelate the rules associated with the key value to reduce such ambiguity.

Although FIG. 4 depicts rules 410-460, one of ordinary skill in the art would recognize that other rule(s) might be used instead. Moreover, one of ordinary skill in the art would recognize that the key values depicted in FIG. 4 are not necessarily actual key values, but rather example values for explanatory purposes.

Figure 6:
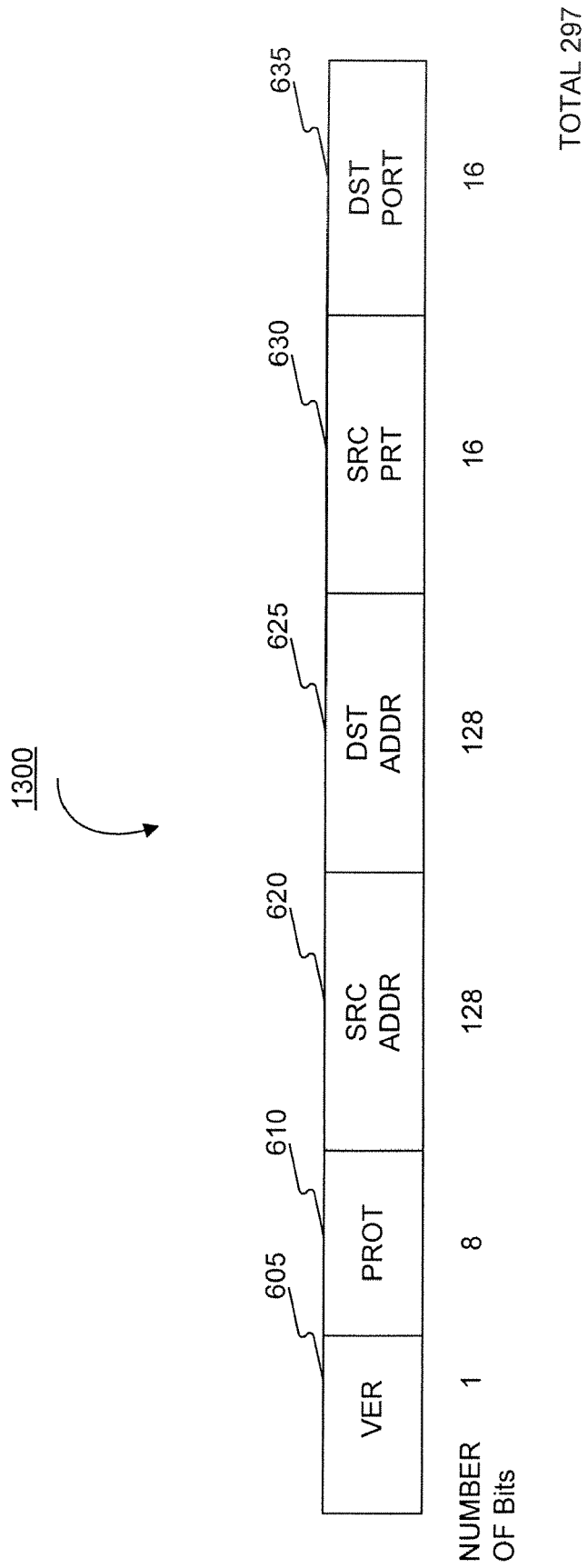
FIG. 6 depicts a decorrelation module in accordance with systems and methods consistent with the present invention.

FIG. 6 depicts a block diagram of an exemplary decorrelation module 1110 decorrelating two overlapping rules. Decorrelation module 1110 functions to decorrelate a first rule (Rule$_1$ labeled 605) and a candidate rule (Rule$_{CANDIDATE}$ labeled 610). FIG. 6 shows that that these two rules 605 and 610 overlap, i.e., some of the source IP addresses apply to both rules. To decorrelate the rules, decorrelation module 1110 orders the rules by writing the first rule 605 and then writing the candidate rule 610 so that it does not overlap with the first rule 605. In this example, decorrelation module 1110 breaks the candidate rule into two sub-rules 615 and 616. For example, if candidate rule 610 defines discarding packets with a source address between 1-256, decorrelation module 1110 creates new sub-rules 615 and 616 from candidate rule 610, with the new rules 615 and 616 having addresses between 1-10 and 241-256—eliminating any overlap. If there are any additional original rules 2131 stored in database 2130, decorrelation module 1110 may then process those additional rules such that the key values do not overlap—forming a set of decorrelated rules 2132.

Figure 7:
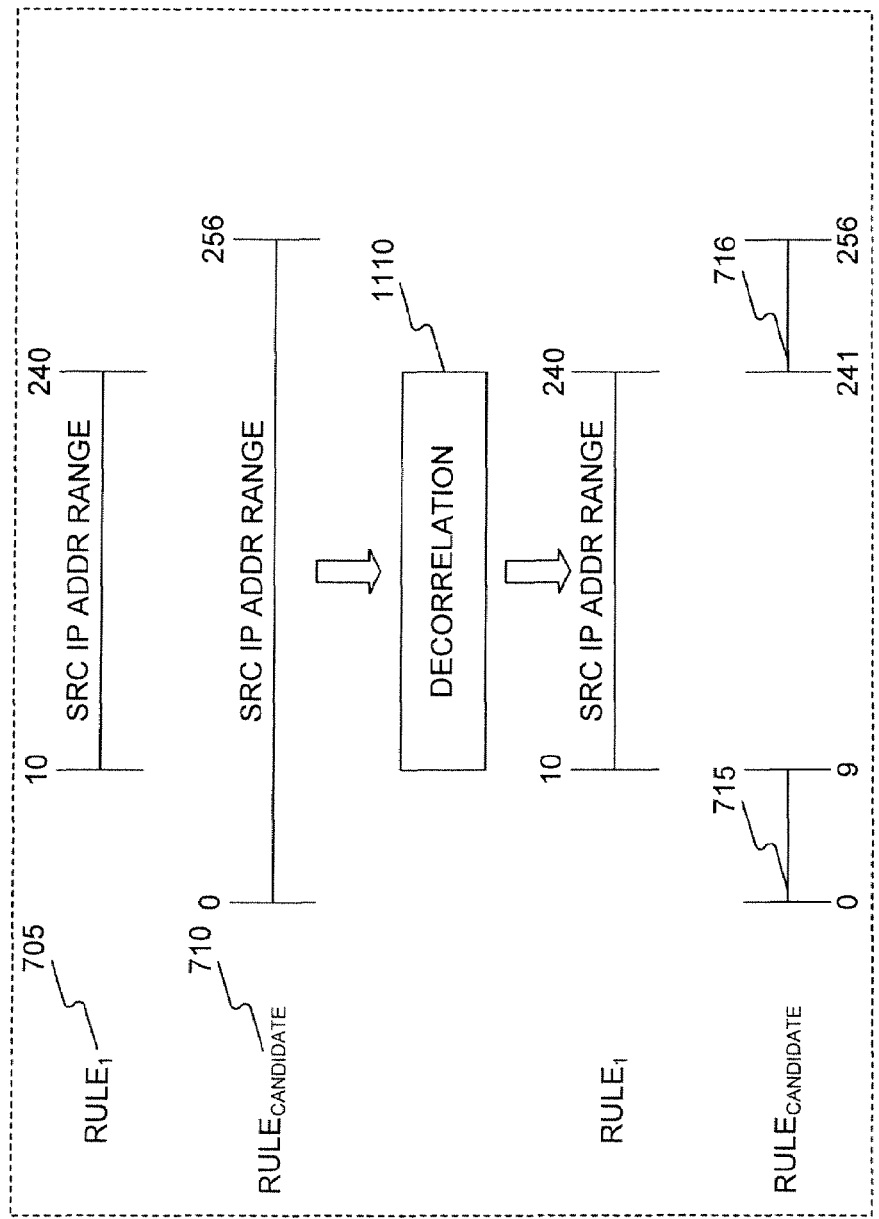
FIG. 7 depicts exemplary steps for decorrelating a set of rules in accordance with systems and methods consistent with the present invention.

Although there are various ways to decorrelate the original rules 2131 to form a set of decorrelated rules 2132, FIG. 7 depicts exemplary steps for decorrelating the set of original rules 2131 to form a set of decorrelated rules 2132. Referring to FIG. 7, decorrelation module 1110 writes the set of original rules in the order given (step 705). For example, the original rules may be as follows: (Rule 1) If the key is 25, then forward to destination A; (Rule 2) Otherwise, if the key 26, then forward to destination B; (Rule 3) Otherwise, if the key is between 20 and 30, discard the packet. As can be seen by this example, the order of the original rule set, which is correlated, affects the outcome. Decorrelation module 1110 then selects for decorrelation a candidate rule from the set of original rules 2131 (step 710). Decorrelation module 1110 then determines whether the key value of the candidate rule overlaps with any of the rules in the set of decorrelated rules 2132. If there is no overlap in the key value, decorrelation module 1110 may simply add the candidate rule to the set of decorrelated rules (step 720). If there are other rules remaining in original rules 2131 that require decorrelation, decorrelation module 1110 selects another candidate rule for decorrelation (steps 725 and 710). Otherwise, the decorrelation module 1110 is done (NO at step 725).

Returning to step 715, if there is an overlap between the candidate rule and any of the rules in the decorrelated rule set (YES at step 715), decorrelation module 1110 may write the candidate rule as one or more decorrelated sub-rules, not having any overlapping key values with the stored set of decorrelated rules 2132 (step 730). If there are any rules remaining in the original set of rules 2131 that require decorrelation (step 740), decorrelation module 1110 repeats step 710. Otherwise, decorrelation module 1110 ends its decorrelation process (NO at step 740). The set of decorrelated rules 2132 may be stored in database 2130 for use within search tree engine module 1120. As such, decorrelation module 1110 decorrelates a set of original rules 2131 to form a set of decorrelated rules 2132, which may be stored in database 2130 and used by search tree engine module 1120 during a rule search.

As noted above, search tree engine module 1120 functions to search a set of decorrelated rules based on a key value read from a packet. Search tree engine module 1120 may be embodied as a data processor capable of performing the steps of executing such a search. Moreover, search tree engine module 1120 may be embodied as a special purpose data processor, such as a Field Programmable Gate Array that includes logic gates and logic gate connections, which can be readily programmed into specific configurations. Alternatively, search tree engine module 1120 may be embodied with comparators and/or registers, as described below with respect to FIGS. 8 and 10.

Figure 5:
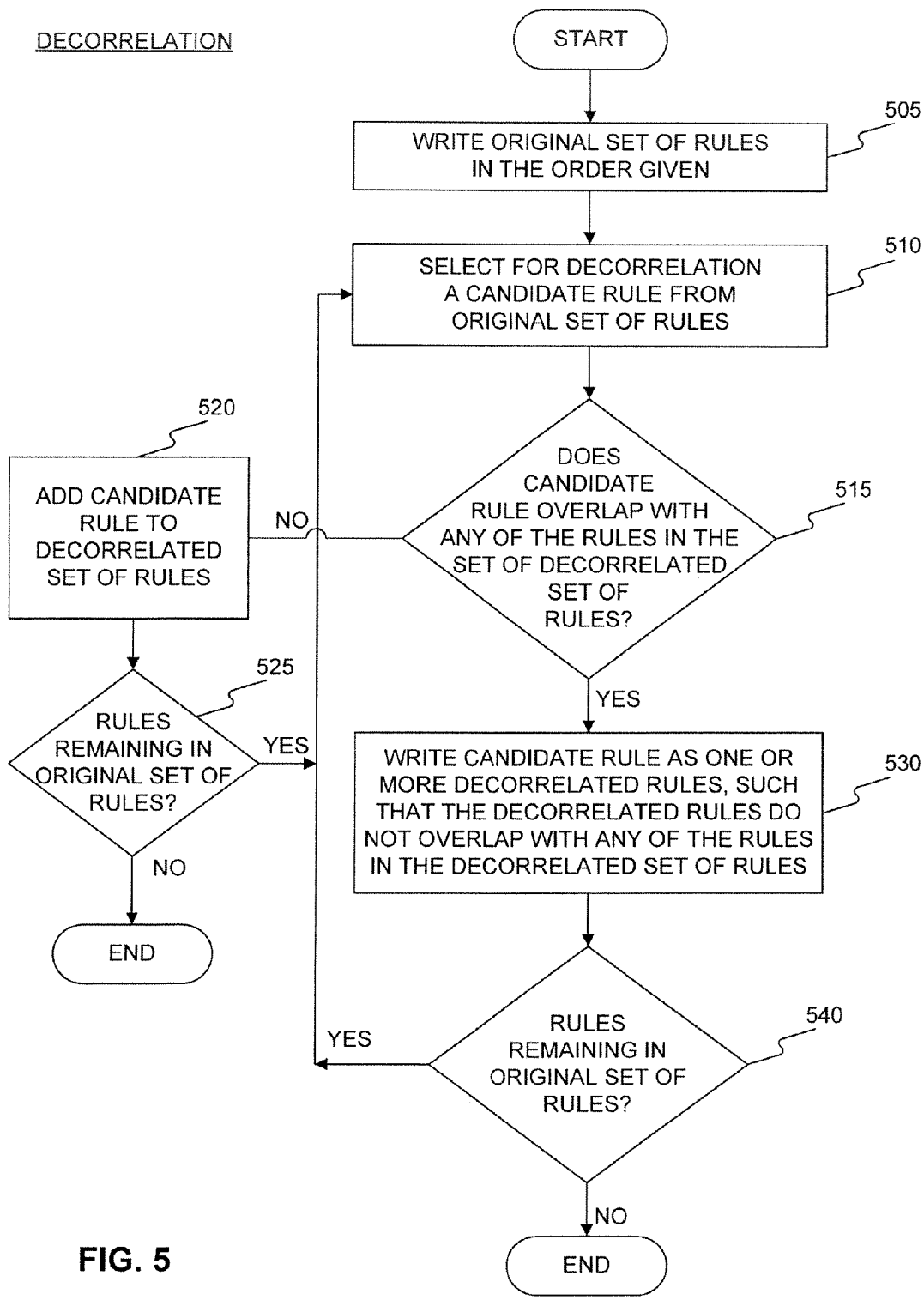
FIG. 5 shows an exemplary packet in accordance with systems and methods consistent with the present invention.

Referring again to FIG. 3, to receive a packet (steps 305), packet classifier 1100 receives a packet, such as packet 1300, from first network 1200. In one embodiment, packet classifier 1100 receives an IP packet, such as the one depicted in FIG. 5. Referring to FIG. 5, packet 1300 includes a version field (labeled "VER") 505, a protocol 510 (labeled "PROT"), a source address (labeled "SRC ADDR") 520, a destination address (labeled "DST ADDR") 525, a source port address (labeled "SRT PRT") 530, a destination port address (labeled "DST PRT") 535, and a variable number of data bits (not shown). FIG. 5 also shows the number of bits in each one of fields 505-535. For example, the source address has 128 bits, with all six fields adding to a total of 297 bits. Version 505 represents the version of IP (e.g., IPv4 or IPv6) to which packet 1300 complies. Protocol field 510 represents a protocol associated with the packet (e.g., TCP (Transport Control Protocol), UDP (User Datagram Protocol), http (hyper text transfer protocol), etc.). Source address 520 represents an address associated with the source of the packet, for example, the sending computer or network of the packet. Destination address 525 represents an address associated with the destination of the packet, for example, the receiving computer or network of the packet. Source port 530 represents a logical connection at the source (e.g., port address 80 represents the well-known port for http connections). Destination port 535 describes a logical connection (e.g., an http connection) at the destination. Table 1 below lists exemplary values for the fields of packet 1300.

TABLE 1

EXEMPLARY VALUES

| VERSION | PRO-TOCOL 510 | SOURCE ADDR 520 | DESTINA-TION ADDR 525 | SOURCE PORT 530 | DESTINA-TION PORT 535 |
|---|---|---|---|---|---|
| 1 | 5 | 127.1.8.0 | 200.1.9.1 | 80 | 80 |

To determine a key value for the received packet (step 310), packet classifier 1100 may simply use all 297 bits of fields 505-535. As such, the key value of packet 1300 defines the source and destination of packet 1300, which can be used to search for a rule defining what operation should be performed on packet 1300. Alternatively, the key value may include only the source address 520. When that is the case, a rule may define, for example, that packets from some source addresses(s) may be discarded and not allowed to traverse from first network 1200 to second network 1205 via packet classifier 1100. While another rule may define that other packets from other source addresses may be allowed to traverse from first network 1200 to second network 1205 via packet classifier 1100. While still another rule may define that a packet from a predetermined source address may require additional processing, such as decryption, encryption, or compression, before being forwarded from first network 1200 through packet classifier 1100 to second network 1205. In these examples, packet classifier 1100 uses a key value comprising source address 520 of the received packet to identify a rule that includes one or more functions (or operations) to apply the received packet. Although the previous example used only the source address 520, one of ordinary skill would recognize that the key value used by packet classifier 1100 might include any one or more of fields 505-535. Moreover, although the description herein refers to fields 505-535 as a key value, packet classifier 1100 may use a hash to map one or more fields 505-535 into another value. For example, a hash function may map (or transform) a 297-bit key value comprising fields 505-535 to a smaller 250-bit key value.

Figure 8:
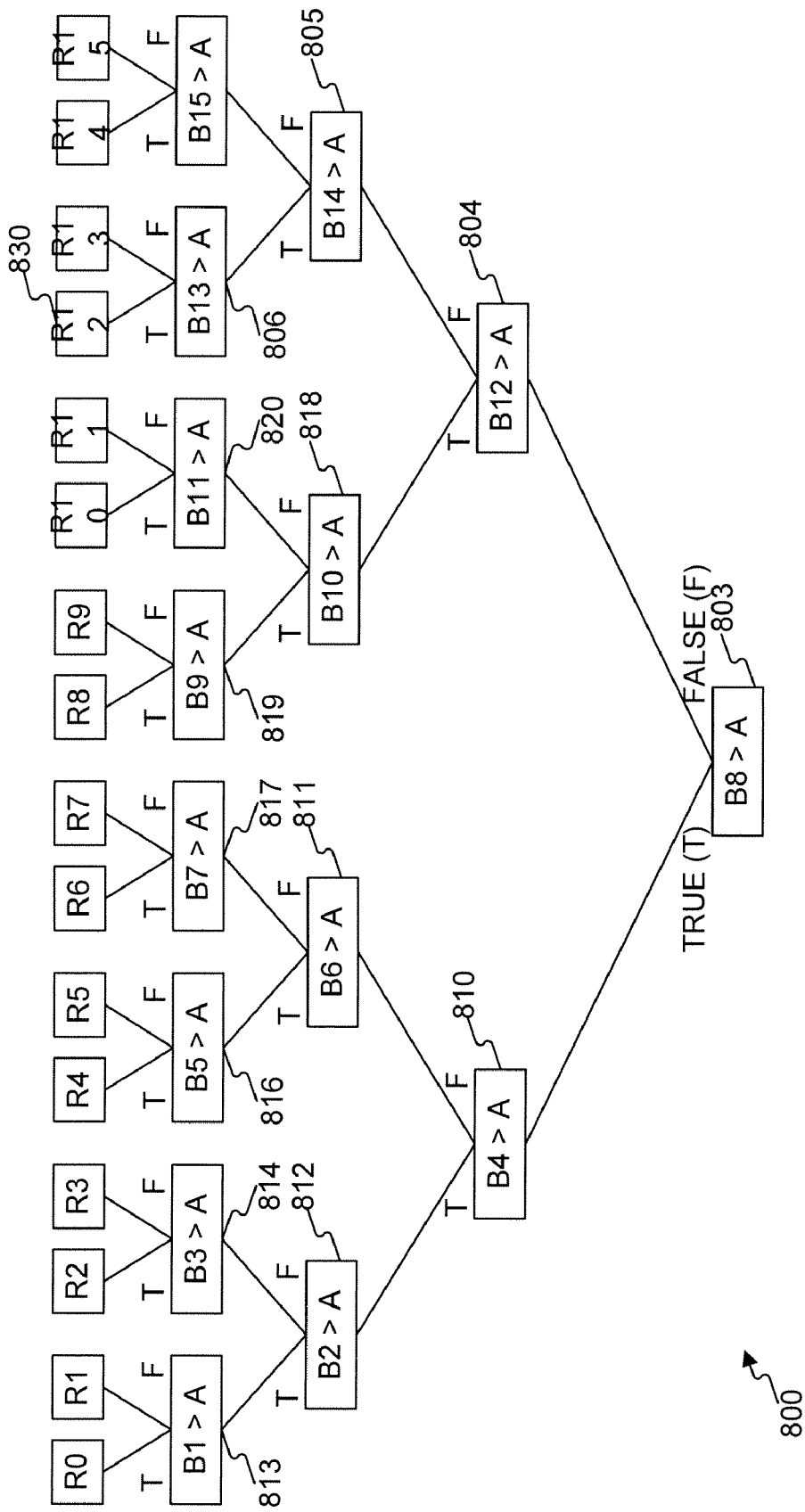
FIG. 8 depicts an exemplary search tree in accordance with systems and methods consistent with the present invention.

To search for a rule, search tree module 1120 may first load into its search tree decorrelated rules 2132 stored in database 2130. Next, module 1120 may search decorrelated rules 2132 for a rule associated with the key value of the received packet (step 320). In one embodiment, search tree engine module 1120 loads the decorrelated rules into a search tree, such as the one depicted in FIG. 8. Referring to FIG. 8, module 1120 searches for a rule based on key value "A" by quickly searching through a search tree 800 to determine which one of the exemplary decorrelated rules (labeled R0 to R15) can be applied to a received packet with the key value A. Search tree 800 includes a plurality of comparators 803-820, each of which compares the key value A to operands (labeled B1-B15) loaded from decorrelated rule set 2132.

Figure 9:
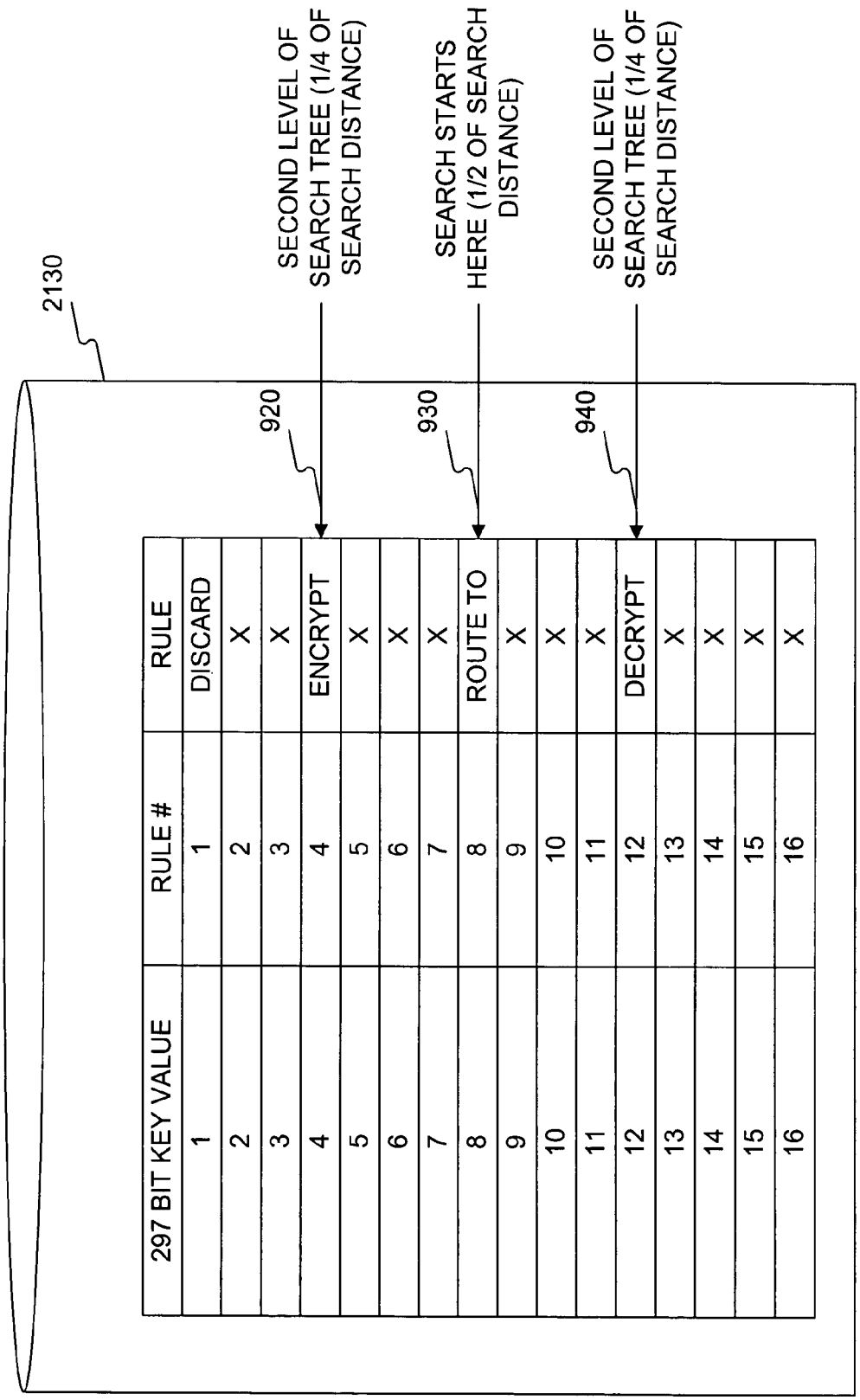
FIG. 9 depicts an exemplary database storing a decorrelated set of rules which may be used in a search tree in accordance with systems and methods consistent with the present invention.

The operand values B1-B15 may be loaded from decorrelated rules 2132 stored in database 2130. The operands B1-B15 represent the key value(s) associated with a rule. Before loading operand values B1-B15, data processor 2110 (or module 1120) sorts decorrelated rules 2132 and selects a midpoint in the decorrelated rule set. FIG. 9 depicts sixteen exemplary decorrelated rules 2132. In this example, the midpoint is rule 8, which also has a key value of 8 (see arrow at 930 labeled "SEARCH STARTS HERE"). The key value 8 is used as an operand value in search tree 800. In particular, the operand value of 8 is loaded into the first comparator 803. The remaining rules may be divided in a binary manner. For example, comparator 804 (B12>A) may be loaded with the key value 12 (see arrow 940), comparator 810 (B4>A) loaded with the key value 4 (see arrow 920), and so forth until all the key values of the rules are loaded into one of the comparators of search tree 800. One of ordinary skill would recognize that other approaches to loading the comparators might be used instead, such as a random loading. Moreover, one of ordinary skill would recognize that the key values of 1 through 16 depicted in FIG. 9 are only exemplary and, as such, other key values may be used instead.

Once comparators 803-820 are loaded with operands representative of key values for decorrelated rules, when a packet is received, search tree 800 may be used to identify the rule based on the key value. For example, if a received packet has a key value of "12," search tree engine module 1120 compares key value 12 to operand B8. The operand of comparator 803 has been loaded with a value of 8 and the key value A (equal to 12). As such, the comparator 803 returns a value of FALSE (or "0") since B8 is not greater than A (see comparator 803 "B*>A"). When a FALSE is returned by comparator 803, comparator 804 is enabled and the comparator 810 (along the TRUE (or "1") path is disabled. Since comparator 804 is enabled, it compares B12 having an operand value of 12 to A (also equal to 12). In this case, comparator 804 returns a value of FALSE since 12 is not greater than key value 12. Next, comparator 805 is enabled by the FALSE from comparator 804. When enabled, comparator 805 compares B14 having an operand value of 14 to key value A (equal to 12). In this example, comparator 805 returns a value of TRUE since B14 is greater than a key value A. The true value returned by comparator 805 enables comparator 806, which compares operand B13 (equal to 13) to key value A (equal to 12). Comparator 806 then returns a value of TRUE since 13 is greater than 12. Lastly, the TRUE from comparator 806 enables register 830 which outputs rule R12 (step 320).

A skilled artisan will recognize that the comparators depicted in FIG. 8 may be embodied using a magnitude comparator, such as the Texas Instruments TTL SN7485 and/or other devices and processors capable of performing such comparisons, such as field programmable gate arrays, arrays of logic gates, application-specific integrated circuits (ASICs). Moreover, although the above description refers to the key value as having a value of "A", one of ordinary skill in the art would be able to appreciate that the key value may have any value and may represent one or more bits, e.g., from 1 to 297 bits. When the key value includes one or more bits, one of ordinary skill in the art would understand that the comparators of FIG. 8 would have to be logically connected to accommodate additional input bits by, for example, adding additional logic gates, such as AND gates and OR gates, to accommodate the additional inputs.

Furthermore, one of ordinary skill in the art would recognize that the structure of search tree 800 is only exemplary. For example, if N rules are used, the search tree may be modified to have N layers of searches, which is unlike FIG. 8 that includes only 16 exemplary rules and 4 ($2^4$=16) search layers.

Figure 10:
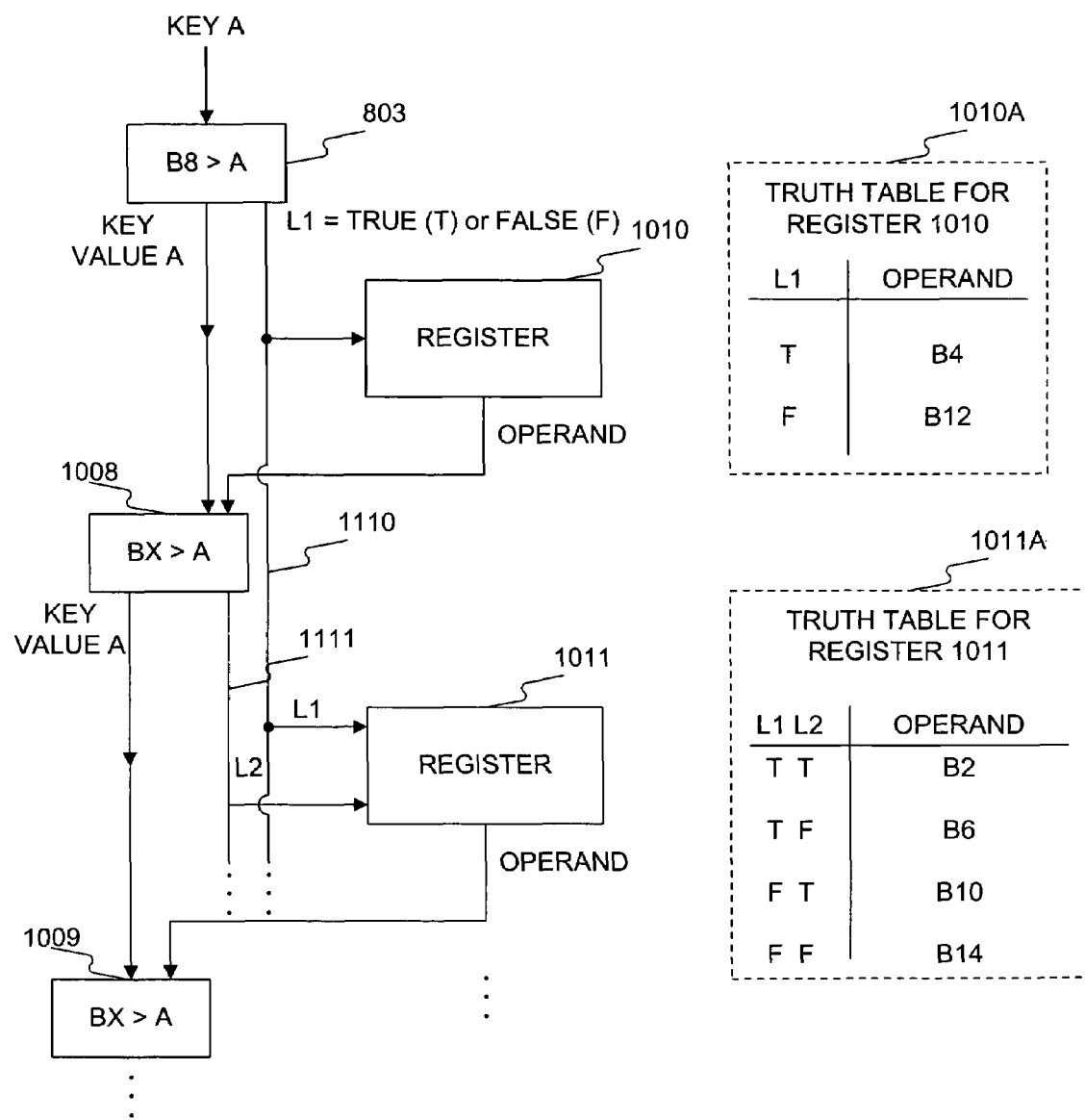
FIG. 10 depicts another exemplary search tree in accordance with systems and methods consistent with the present invention

FIG. 10 depicts another exemplary embodiment of a search tree for use in search tree engine module 1120. FIG. 10 uses a register to store operand values, which reduces the total number of required comparators. Referring to FIG. 10, the search tree includes comparators 803, 1008, and 1009, and one or more registers 1010-1011. The register may be embodied as any addressable memory device such as Static Random Access Memory (SRAM), Dynamic Random Access Memory (DRAM), or Content Addressable Memory (CAM). Comparators 1008-1009 are similar to comparator 803, described above, except that comparators 1008-1009 are loaded with an operand value provided from a previous layer of the tree.

Returning to the above example used with respect to FIG. 8, when the received packet has a key value of 12, comparator 803 compares key value 12 to operand B8. In this comparison, operand B8 has a value of 8 and the key value has a value of 12. As such, the comparator 803 outputs a value of FALSE (or L1=0) and outputs the key value 12 for the next comparator 1008. Register 1010 receives the L1=0 value from comparator 803 and outputs an operand associated with rule B12. If register 1010 were to receive a value of TRUE (or "1"), register 1010 would output the operand for rule B4, i.e., the value 4 in this example. FIG. 10 depicts an exemplary truth table 1010 A that determines the operand output of register 1010 based on the value L1. Next, comparator 1008 compares the operand value BX received from register 1010, in this example BX is equal to 12, to key value A (also equal to 12) received from comparator 803. Since both B12 and A in this example equal 12, comparator 1008 returns a value of FALSE (or L2=0) since B12 is not greater than A. The next comparator 1009 receives key value A output by comparator 1008 and receives the output of register 1011. At this level, comparator uses two-bits to select between operands B2, B6, B10, and B14. The two-bits correspond to one bit from comparator 803 (line 1110 labeled L1) and a second bit from comparator 1008 (line 1111 labeled L2). In this example, L1 and L2 equal "FALSE" and "FALSE," causing register 1011 to output the operand value for rule B14 (which in this example is 14). A truth table 1011 A shows the values for the operand output by register 1011 based on the value of L1 and L2.

At this point, one of ordinary skill in the art will understand that the registers may be used in combination with the comparators to reduce the total number of comparator circuits. Moreover, the layers of search tree 8000 may be extended to 4 layers as in FIG. 8 or any other number of layers, as described above. In any case, the output of the search tree depicted in FIGS. 8 and 10 is a rule that corresponds to a key value for the received packet (step 320). The rule enables a processor to classify the received packet based on its key value and then apply the rule to the received packet. Returning to FIG. 8, rule R12 830 is identified as the rule that corresponds to key value A. Rule 830 functions to decrypt packet 1300 (see, e.g., FIG. 9 at 940). Packet 1300 is thus classified based on its key value as a packet requiring decryption As such, systems and methods are described herein that facilitate high-speed packet processing by determining a key value for a received packet. The key value is read from the packet (e.g., packet address information) and then used to search a set of rules, which have been decorrelated such that there is no overlap in the key values of the rules. When the decorrelated set of rules are loaded in a search tree, such as one comprising hardware comparators and registers, the identification of a rule from a decorrelated rule set is faster when compared to using rules that overlap.

The systems and methods disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

What is claimed is:

1. A method of classifying packets comprising:
   determining a packet key value for a packet; and
   identifying a rule for the packet, the rule corresponding to the determined packet key value, the identifying comprising searching a set of decorrelated rules,
      each of the decorrelated rules having a unique corresponding key value, and
      the decorrelated rules generated by decorrelating candidate rules in a set of original rules, the decorrelating comprising modifying a candidate rule based on the corresponding key values of decorrelated members of the set of original rules so that a corresponding key value of the candidate rule does not overlap with the corresponding key values of the decorrelated members of the set of original rules.

2. The method of claim 1 further comprising:
   processing the packet based on the identified rule.

3. The method of claim 1, wherein determining the packet key value further comprises:
   reading a portion of the packet, the read portion being the packet key value.

4. The method of claim 1, wherein determining the packet key value further comprises:
   using a source address of the packet as the packet key value.

5. The method of claim 1, wherein identifying the rule comprises:
   searching a search tree of the set of decorrelated rules, the search tree being searchable based on the packet key value.

6. A method of classifying packets comprising:
   determining a packet key value for a packet received from a first network;
   determining a rule for the packet, the rule corresponding to the determined packet key value, the determining comprising searching a search tree having a set of decorrelated rules
      each of the decorrelated rules having a unique corresponding key value, and
      the decorrelated rules generated by decorrelating candidate rules in a set of original rules, the decorrelating comprising modifying a candidate rule based on the corresponding key values of decorrelated members of the set of original rules so that a corresponding key value of the candidate rule does not overlap with the corresponding key values of the decorrelated members of the set of original rules; and classifying the packet based on the determined rule, such that the determined rule may be applied to the packet.

7. The method of claim 6, further comprising:
processing the packet based on the determined rule.

8. The method of claim 6, further comprising:
processing the packet, such that the packet is forwarded to a second network based on the determined rule.

9. The method of claim 6, further comprising:
processing the packet, such that the packet is discarded based on the determined rule.

10. The method of claim 6, further comprising:
processing the packet, such that the packet is encrypted based on the determined rule.

11. The method of claim 6, wherein decorrelating further comprises:
selecting a candidate rule.

12. The method of claim 11, further comprising:
forming at least one other rule based on the candidate rule, the at least one other rule having a corresponding key value without any overlap with any other key values of any other rules.

13. The method of claim 6, wherein determining the rule further comprises:
loading at least one comparator with one or more operand values, the operand values being representative of key values corresponding to the set of decorrelated rules.

14. The method of claim 13, wherein determining the rule further comprises:
searching the search tree based on the operand values and the determined packet key value.

15. The method of claim 6, wherein determining the rule further comprises:
loading at least one comparator and at least one register with one or more operand values, the operand values representative of key values corresponding to the set of decorrelated rules.

16. A system comprising:
means for determining a packet key value for a packet;
means for identifying a rule for the packet corresponding to the determined packet key value, the identifying comprising searching a set of decorrelated rules,
each of the decorrelated rules having a unique corresponding key value, and
the decorrelated rules generated by decorrelating candidate rules in a set of original rules, the decorrelating comprising modifying a candidate rule based on the corresponding key values of decorrelated members of the set of original rules so that a corresponding key value of the candidate rule does not overlap with the corresponding key values of the decorrelated members of the set of original rules.

17. A system comprising:
means for determining a packet key value for a packet received from a first network;
means for determining a rule for the packet, the rule corresponding to the determined packet key value, the determining comprising searching a search tree having a set of decorrelated rules
each of the decorrelated rules having a unique corresponding key value, and
the decorrelated rules generated by decorrelating candidate rules in a set of original rules, the decorrelating comprising modifying a candidate rule based on the corresponding key values of decorrelated members of the set of original rules so that a corresponding key value of the candidate rule does not overlap with the corresponding key values of the decorrelated members of the set of original rules; and means for classifying the packet based on the determined rule, such that the determined rule may be applied to the packet.

18. A system for classifying packets, the system comprising:
a processor; and
a memory,
wherein the processor and the memory are configured to perform a method comprising:
determining a packet key value for a packet; and
identifying a rule for the packet, the rule corresponding to the determined packet key value, the identifying comprising searching a set of decorrelated rules,
each of the decorrelated rules having a unique corresponding key value, and
the decorrelated rules generated by decorrelating candidate rules in a set of original rules, the decorrelating comprising modifying a candidate rule based on the corresponding key values of decorrelated members of the set of original rules so that a corresponding key value of the candidate rule does not overlap with the corresponding key values of the decorrelated members of the set of original rules.

19. The system of claim 18 wherein the processor and the memory are configured to perform a method further comprising:
processing the packet based on the identified rule.

20. The system of claim 18 wherein the processor and the memory are configured to perform a method further comprising:
reading a portion of the packet, the read portion being the packet key value.

21. The system of claim 18 wherein the processor and the memory are configured to perform a method further comprising:
using a source address of the packet as the packet key value.

22. The system of claim 18 wherein the processor and the memory are configured to perform a method further comprising:
searching a search tree of the set of decorrelated rules, the search tree being searchable based on the packet key value.

23. A computer-readable medium embodied with computer instructions to be executed by a computer for performing a method for classifying packets, the method comprising:
determining a packet key value for a packet; and
identifying a rule for the packet, the rule corresponding to the determined packet key value, the identifying comprising searching a set of decorrelated rules,
each of the decorrelated rules having a unique corresponding key value, and
the decorrelated rules generated by decorrelating candidate rules in a set of original rules, the decorrelating comprising modifying a candidate rule based on the corresponding key values of decorrelated members of the set of original rules so that a corresponding key value of the candidate rule does not overlap with the corresponding key values of the decorrelated members of the set of original rules.

24. The computer-readable medium of claim 23 wherein the method further comprises:
processing the packet based on the identified rule.

25. The computer-readable medium of claim 23 wherein the method further comprises:
reading a portion of the packet, the read portion being the packet key value.

26. The computer-readable medium of claim 23 wherein the method further comprises:
using a source address of the packet as the packet key value.

27. The computer-readable medium of claim 23 wherein the method further comprises:
searching a search tree of the set of decorrelated rules, the search tree being searchable based on the packet key value.

28. A network comprising a plurality of processors of a system interfaced to the network, the system comprising:
at least one processor; and
a memory,
wherein the processor and the memory are configured to perform a method comprising:
determining a packet key value for a packet; and
identifying a rule for the packet, the rule corresponding to the determined packet key value, the identifying comprising searching a set of decorrelated rules,
each of the decorrelated rules having a unique corresponding key value, and
the decorrelated rules generated by decorrelating candidate rules in a set of original rules, the decorrelating comprising modifying a candidate rule based on the corresponding key values of decorrelated members of the set of original rules so that a corresponding key value of the candidate rule does not overlap with the corresponding key values of the decorrelated members of the set of original rules.

29. A packet classification module comprising:
a processor; and
a memory,
wherein the processor and the memory are configured to perform a method comprising:
determining a packet key value for a packet received from a first network;
determining a rule for the packet the rule corresponding to the determined packet key value, the determining comprising searching a search tree having a set of decorrelated rules,
each of the decorrelated rules having a unique corresponding key value, and
the decorrelated rules generated by decorrelating candidate rules in a set of original rules, the decorrelating comprising modifying a candidate rule based on the corresponding key values of decorrelated members of the set of original rules so that a corresponding key value of the candidate rule does not overlap with the corresponding key values of the decorrelated members of the set of original rules; and
classifying the packet based on the determined rule, such that the determined rule may be applied to the packet.

30. A packet classification module comprising:
a processor; and
a memory,
wherein the processor and the memory are configured to perform a method comprising:
determining a packet key value for a packet received from a first network;
classifying the packet based on a rule identified by a search tree having a set of decorrelated rules,
each of the decorrelated rules having a unique corresponding key value, and
the decorrelated rules generated by decorrelating candidate rules in a set of original rules, the decorrelating comprising modifying a candidate rule based on the corresponding key values of decorrelated members of the set of original rules so that a corresponding key value of the candidate rule does not overlap with the corresponding key values of the decorrelated members of the set of original rules.

31. A computer-readable medium embodied with computer instructions to be executed by a computer for performing a method for classifying packets comprising:
determining a packet key value for a packet received from a first network;
determining a rule for the packet, the rule corresponding to the determined packet key value, the determining comprising searching a search tree having a set of decorrelated rules,
each of the decorrelated rules having a unique corresponding key value, and
the decorrelated rules generated by decorrelating candidate rules in a set of original rules, the decorrelating comprising modifying a candidate rule based on the corresponding key values of decorrelated members of the set of original rules so that a corresponding key value of the candidate rule does not overlap with the corresponding key values of the decorrelated members of the set of original rules; and
classifying the packet based on the determined rule, such that the determined rule may be applied to the packet.

32. A computer-readable medium embodied with computer instructions to be executed by a computer for performing a method for classifying packets, the method comprising:
determining a packet key value for a packet received from a first network;
classifying the packet based on a rule identified by a search tree having a set of decorrelated rules,
each of the decorrelated rules having a unique corresponding key value, and
the decorrelated rules generated by decorrelating candidate rules in a set of original rules, the decorrelating comprising modifying a candidate rule based on the corresponding key values of decorrelated members of the set of original rules so that a corresponding key value of the candidate rule does not overlap with the corresponding key values of the decorrelated members of the set of original rules.

* * * * *